United States Patent
Huelke et al.

(10) Patent No.: US 10,189,433 B2
(45) Date of Patent: Jan. 29, 2019

(54) EXTRUDED 3D RAMP/PACKAGING DEVICE FOR TIGHT PACKAGE REQUIREMENTS

(71) Applicant: FORD MOTOR COMPANY, Dearborn, MI (US)

(72) Inventors: David Huelke, Milan, MI (US); Eric Axel Smitterberg, Berkley, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 15/053,538

(22) Filed: Feb. 25, 2016

(65) Prior Publication Data
US 2017/0247011 A1    Aug. 31, 2017

(51) Int. Cl.
| | | |
|---|---|---|
| *B60R 21/217* | (2011.01) |
| *B60R 21/232* | (2011.01) |
| *B60R 21/213* | (2011.01) |
| B60R 21/16 | (2006.01) |

(52) U.S. Cl.
CPC ......... *B60R 21/232* (2013.01); *B60R 21/213* (2013.01); *B60R 21/2171* (2013.01); *B60R 21/2176* (2013.01); *B60R 2021/161* (2013.01)

(58) Field of Classification Search
CPC . B60R 21/213; B60R 21/232; B60R 21/2171; B60R 21/2176; B60R 2021/161
See application file for complete search history.

(56) References Cited

U.S. PATENT DOCUMENTS

| | | | | |
|---|---|---|---|---|
| 5,265,903 A | * | 11/1993 | Kuretake | B60R 21/213 280/730.2 |
| 5,681,055 A | | 10/1997 | Green et al. | |
| 5,791,683 A | * | 8/1998 | Shibata | B60R 21/201 280/730.1 |
| 5,899,486 A | * | 5/1999 | Ibe | B60R 21/213 280/728.2 |
| 5,921,575 A | * | 7/1999 | Kretschmer | B60R 21/213 280/728.2 |
| 6,079,732 A | * | 6/2000 | Nakajima | B60R 13/025 280/728.1 |
| 6,082,761 A | * | 7/2000 | Kato | B60R 21/213 280/728.2 |
| 6,106,006 A | * | 8/2000 | Bowers | B60R 21/213 280/730.2 |

(Continued)

OTHER PUBLICATIONS

"Side Curtain Air Bags"; Jeep Grand Cherokee WJ; http://wjjeeps.com/airbags.htm; Jan. 16, 2013; pp. 1-2.

*Primary Examiner* — Laura Freedman
(74) *Attorney, Agent, or Firm* — Marla Johnston; King & Schickli PLLC

(57) ABSTRACT

An air curtain delivery assembly includes an arcuate extruded unitary channel and an inflatable air curtain. The channel includes a longitudinal length defining an arc substantially matching a fore-aft curvature of a vehicle roof panel and having an open mouth defining a ramp for directing deployment of the inflatable air curtain from an interior of the channel and inboard of a vehicle side structure. The channel may further be configured and dimensioned for attaching to a portion of the vehicle roof panel and beneath a trim piece overlying the vehicle side structure. The channel may further include a vehicle-forward portion substantially matching a downward angle of a vehicle A pillar.

18 Claims, 5 Drawing Sheets

(56) References Cited

U.S. PATENT DOCUMENTS

| | | | | |
|---|---|---|---|---|
| 6,129,377 A * | 10/2000 | Okumura | B60R 21/213 | 280/730.2 |
| 6,220,623 B1 * | 4/2001 | Yokota | B60R 21/213 | 280/728.2 |
| 6,238,438 B1 * | 5/2001 | Fischer | B60R 21/213 | 280/728.2 |
| 6,254,123 B1 * | 7/2001 | Urushi | B60R 21/213 | 280/730.2 |
| 6,302,434 B2 | 10/2001 | Nakajima et al. | | |
| 6,305,707 B1 * | 10/2001 | Ishiyama | B60R 21/213 | 280/728.2 |
| 6,336,651 B1 * | 1/2002 | Mramor | B60R 21/213 | 280/728.2 |
| 6,364,349 B1 * | 4/2002 | Kutchey | B60R 21/213 | 280/728.3 |
| 6,371,512 B1 * | 4/2002 | Asano | B60R 21/213 | 280/728.2 |
| 6,439,598 B1 * | 8/2002 | Braun | B60R 21/213 | 280/728.2 |
| 6,793,241 B2 * | 9/2004 | Wallner | B60R 21/213 | 24/455 |
| 6,923,471 B2 * | 8/2005 | Salzle | B60R 21/213 | 280/728.2 |
| 7,017,942 B2 * | 3/2006 | Elqadah | B60N 3/02 | 280/728.2 |
| 7,175,196 B2 * | 2/2007 | Boxey | B60R 21/2171 | 280/730.2 |
| 7,401,805 B2 | 7/2008 | Coon et al. | | |
| 7,677,593 B2 | 3/2010 | Downey | | |
| 7,735,857 B2 * | 6/2010 | Hidaka | B60R 21/213 | 280/728.2 |
| 9,004,525 B2 | 4/2015 | Ruedisueli et al. | | |

\* cited by examiner

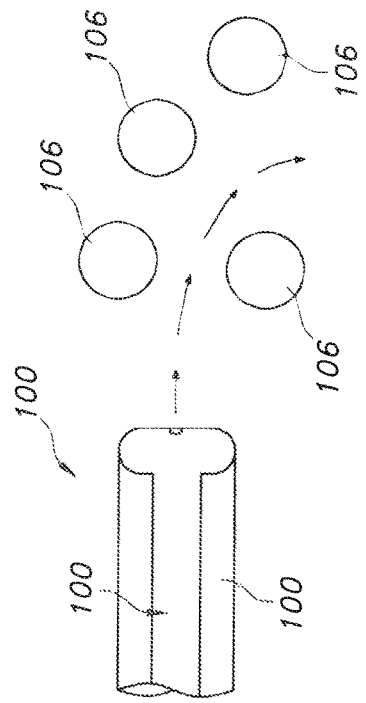
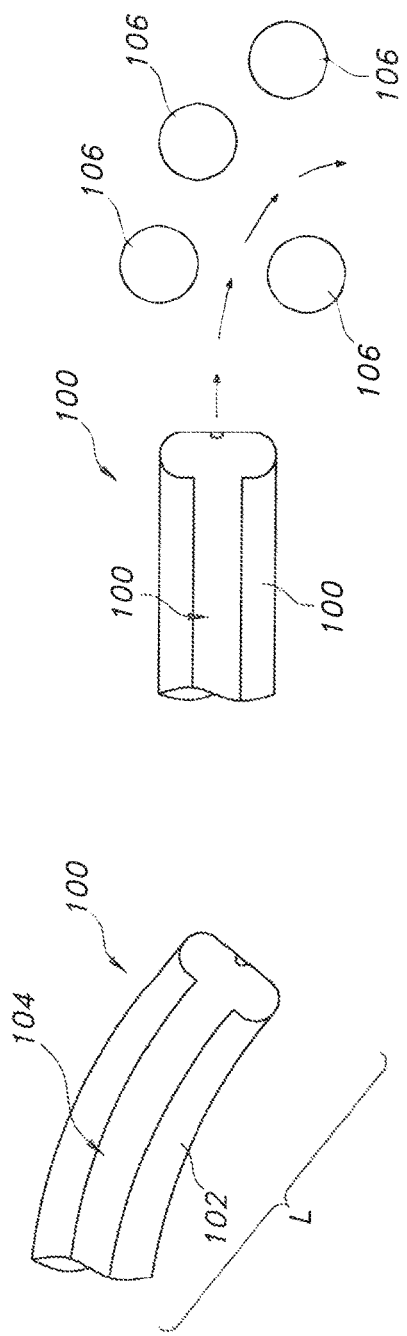
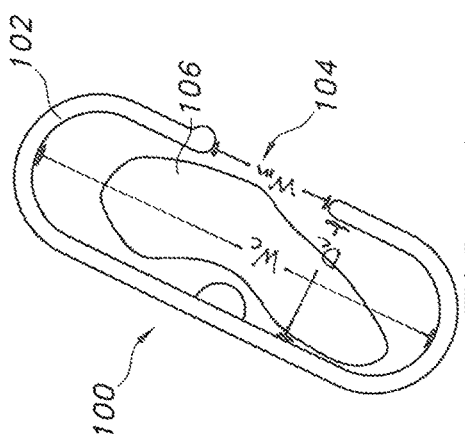

EXTRUDED 3D RAMP/PACKAGING DEVICE FOR TIGHT PACKAGE REQUIREMENTS

TECHNICAL FIELD

This disclosure relates generally to air bags and air curtains for motor vehicles, and more particularly to an improved extruded ramp for an air curtain, for use in limited package spaces.

BACKGROUND

Various inflatable protective devices are known for protecting occupants of a vehicle passenger cabin, including inflatable air bags and air curtains. As is known, such devices are inflatable envelopes operatively associated with a suitable rapid inflator which, on detection of a collision by a suitable sensor, cause a rapid inflation of the inflatable envelope by a gas to protect a vehicle occupant from impact against surfaces such as the dashboard, steering wheel, side doors, windshield, windows, etc. Inflatable air bags and air curtains are mounted in a variety of vehicle components. For example, steering wheel and dashboard-mounted airbags are known. Likewise, it is known to provide inflatable air curtains, such as side air curtains configured for rapid deployment to a position interposed between a vehicle occupant and a vehicle side structure such as a door panel. Roof-mounted and seat-mounted side air curtains are known.

In styling vehicle interiors including such air bags and air curtains, packaging restrictions must be considered. That is, the amount of space required to install an air curtain deployment assembly must be factored in, including the device into which the air curtain is stowed prior to deployment at need. Particular issues exist with packaging side air curtains, headliners, and pillar trim pieces. Typically, the side air curtain is packaged by attaching to the roof panel sheet metal, beneath the vehicle headliner and side window and door trim pieces, disposed for deploying outwardly and downwardly to cover side windows, pillar trim, etc. Oversized side window and door trim pieces for covering side air curtain deployment assemblies are typically undesirable to consumers. Conventional alternative solutions such as over-constraining the air curtain envelope to reduce the amount of space occupied by a stowed air curtain risk impairing rapid deployment of the air curtain.

Accordingly, a need is identified in the art for an air curtain delivery assembly which accommodates such packaging restrictions without impairing deployment of the air curtain at need.

SUMMARY

In accordance with the purposes and benefits described herein, an air curtain delivery assembly is described including an arcuate extruded unitary channel and an inflatable air curtain. The channel has an open mouth defining a ramp for directing deployment of the inflatable air curtain from an interior of the channel to at least partially overlie a vehicle side structure. The channel may further include a longitudinal length defining an arc substantially matching a vehicle fore-aft curvature of a vehicle roof panel. The open mouth is defined along that longitudinal length. In embodiments, the channel includes a vehicle-forward portion substantially matching a downward angle of a vehicle A pillar. In embodiments, the channel is configured and dimensioned for attaching to a portion of the vehicle roof panel below a vehicle headliner and/or a trim piece overlying a vehicle side structure. The open mouth directs deployment of the air curtain over a vehicle pillar trim piece.

In another aspect, a delivery device for an inflatable air curtain is described comprising an arcuate extruded unitary channel having a longitudinal length defining a predetermined fore-aft curvature and having an open mouth defining a ramp for directing deployment of the inflatable air curtain from an interior of the channel and inboard of a vehicle side structure. The open mouth is defined along that longitudinal length. The predetermined fore-aft curvature may substantially match a cooperating vehicle roof panel fore-aft curvature. In embodiments, the channel includes a vehicle-forward portion substantially matching a downward angle of a vehicle A pillar. In embodiments, the channel is configured and dimensioned for attaching to a portion of the vehicle roof panel below a vehicle headliner and/or a trim piece overlying a vehicle side structure. In embodiments, the open mouth directs deployment of the inflatable air curtain inboard of the trim piece overlying the vehicle side structure and over a vehicle pillar trim piece.

In the following description, there are shown and described embodiments of the disclosed air curtain delivery assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed air curtain delivery assembly, and together with the description serve to explain certain principles thereof. In the drawing:

FIG. 1A depicts a side view of an extruded channel for air curtain packaging/delivery according to the present disclosure;

FIG. 1B depicts the formation of the channel of FIG. 1A by an extrusion process;

FIG. 1C shows a cross-sectional view of the channel of FIG. 1A;

Reference will now be made in detail to embodiments of the disclosed air curtain delivery assembly, examples of which are illustrated in the accompanying drawing figures.

DETAILED DESCRIPTION

With reference to FIG. 1A, a delivery device 100 for an air curtain (not shown in this view) is provided comprising an extruded unitary channel 102 having a longitudinal length L. As formed, the channel 102 defines an open mouth 104 defining a ramp for directing deployment of an air curtain in a desired direction. As shown (see FIG. 1C), the channel 102 is defined by a cross-section width Wc that is greater than a cross-section depth Dc. In turn, the open mouth 104 has a mouth width Wm that is less than the cross-section width Wc. As will be appreciated, the channel 102, during extrusion and while still hot, may be passed (see arrows) through a series of rollers or other shaping devices (see FIG. 1B) to provide a desired fore-aft curvature as shown in FIG. 1A, and then cut to a desired length. Typically, the fore-aft curvature will be selected to substantially match a vehicle roof panel (not shown in this view) fore-aft curvature.

An air curtain 106 (see FIG. 1C) may then be packaged within the channel 102. The basic design of an air curtain 106, being an inflatable envelope designed for rapid deployment in the event of a collision of sufficient force, is well known in the art and does not require substantial description herein.

Figure 2:
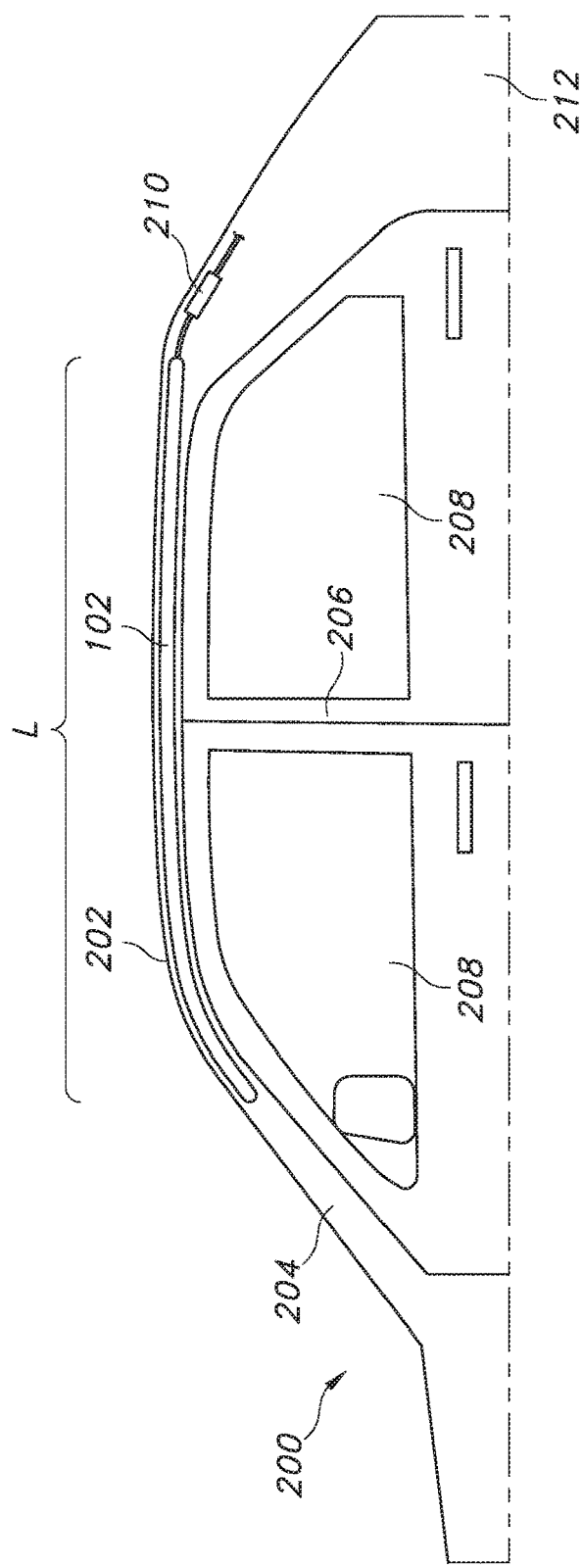
FIG. 2 depicts the extruded channel of FIG. 1A installed in a vehicle.

In use (see FIG. 2), the channel 102 is secured to a vehicle 200 roof panel 202, below and substantially at a juncture of the vehicle headliner (not shown in this view) and side trim pieces (not shown in this view) for deployment downwardly and over the A pillar 204 and B pillar 206 trim pieces, to cover those trim pieces and also side windows 208. As shown, the channel 102 fore-aft curvature substantially matches the vehicle roof panel 202 fore-aft curvature. Also as shown, in the depicted embodiment the vehicle-foremost portion of the channel 102 is provided with a curvature matching a downward angle of the A pillar 204. An air curtain inflator assembly 210 as is well known in the art is typically provided, and may be installed below the vehicle C pillar 212 trim.

Figure 3:
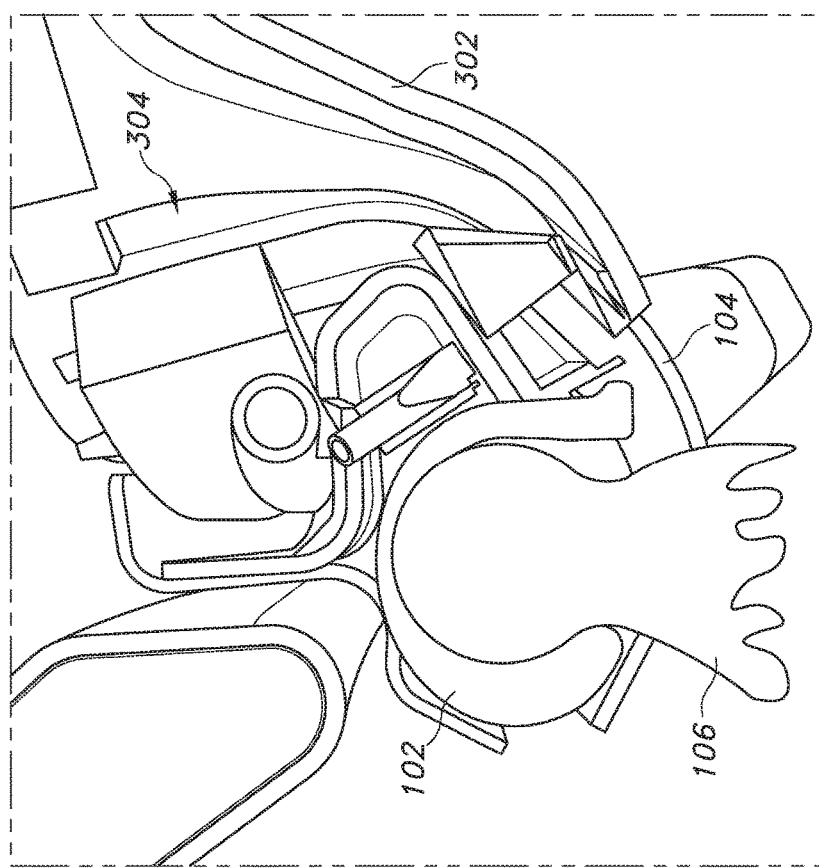
FIG. 3 shows a cross-sectional view of the installed extruded channel.

The installation is shown in greater detail in FIG. 3. As shown therein, the extruded channel 102 is disposed at a juncture of the vehicle headliner 302 and side trim pieces, including pillar trim piece 304, whereby the air curtain 106 (deployed/deploying as depicted) will deploy in a desired direction inboard of the side trim pieces as will be described.

Figure 4A:
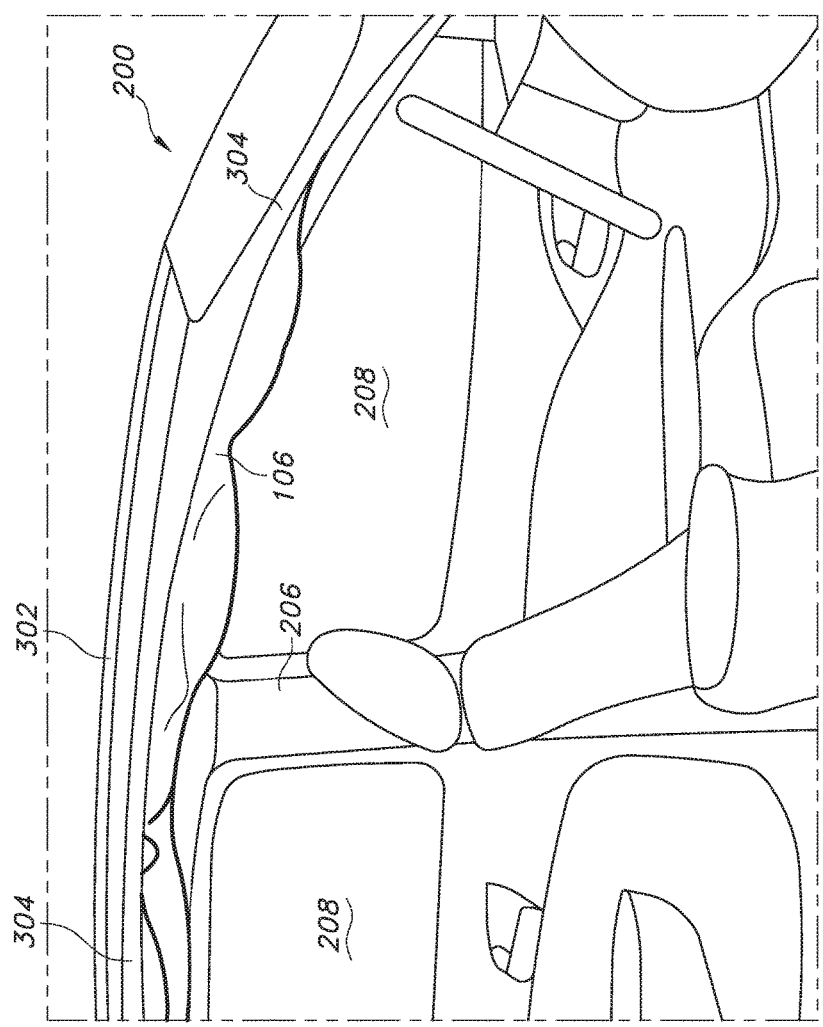
FIG. 4A shows an air curtain deploying from the extruded channel.
Figure 4B:
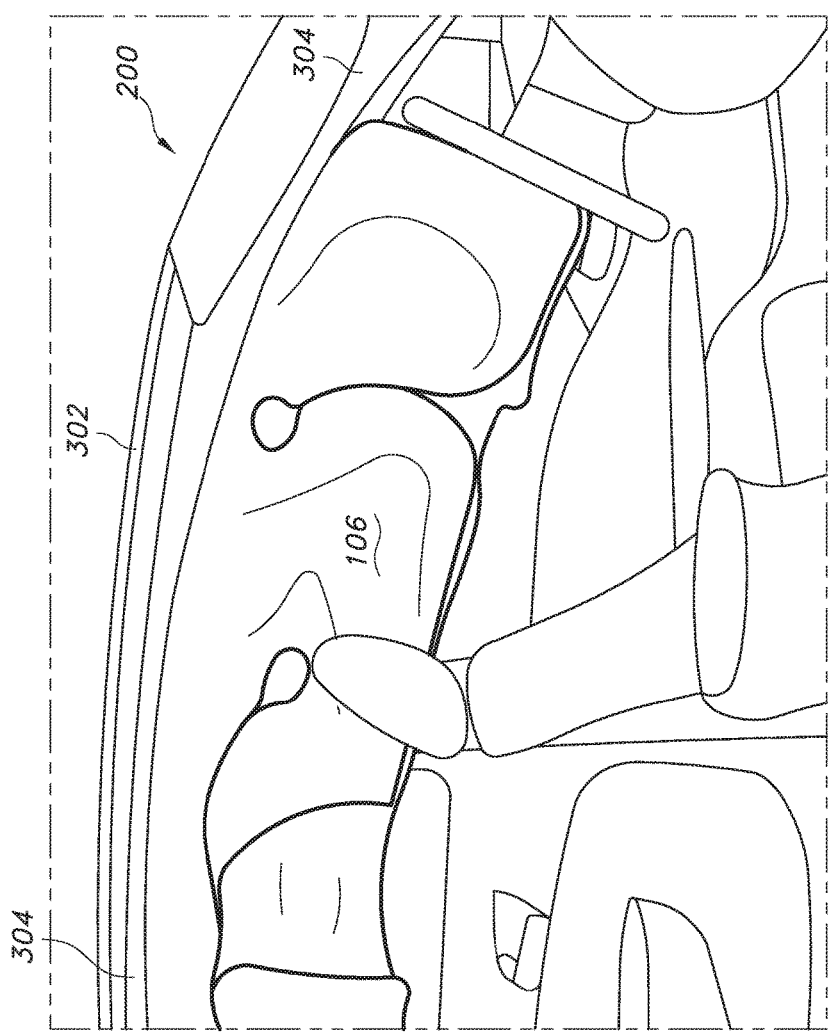
FIG. 4B shows the air curtain of FIG. 4A fully deployed.

With reference to FIGS. 4A-4B, as shown on occurrence of a side impact of sufficient force as detected by a suitable collision sensor (not shown), air curtain 106 deploys downwardly from below the headliner 302/side trim pieces 304 and over side windows 208, B pillar 206 trim, etc., covering those structures (see FIG. 4B) to assist in reducing injury to a vehicle occupant from the side impact.

Accordingly, there is provided an air curtain packaging and delivery device and system which is suitable for use in limited package spaces, such as below the conventional vehicle headliner and side trim pieces. Advantageously, use of oversized trim pieces to overlay and hide the air curtain delivery system is not required. Still more, alternative methods for reducing the packaging space for an air curtain delivery system such as over-constraining the air curtain, which potentially could interfere with the deployment of the air curtain, are not required.

Obvious modifications and variations are possible in light of the above teachings. For example, the foregoing disclosure predominantly describes the air curtain delivery system in the context of a side air curtain system. However, the skilled artisan will readily appreciate that the devices are equally adaptable to other air curtain placements, such as seat-mounted side airbag/air curtain systems. All such modifications and variations are within the scope of the appended claims when interpreted in accordance with the breadth to which they are fairly, legally and equitably entitled.

What is claimed:

1. An air curtain delivery assembly, comprising:
   an arcuate extruded unitary channel defining a cross-section width that is greater than a cross-section depth; and
   an inflatable air curtain;
   the channel having a longitudinal length defining an arc substantially matching a vehicle fore-aft curvature of a vehicle roof panel and having an open mouth defining a mouth width to provide a ramp for directing deployment of the inflatable air curtain from an interior of the channel and inboard of a vehicle side structure;
   wherein the mouth width is less than the cross-section width.

2. The air curtain delivery assembly of claim 1, further wherein the channel is configured and dimensioned for attaching to a portion of the vehicle roof panel beneath a vehicle headliner and/or a trim piece overlying the vehicle side structure and the open mouth is positioned to deploy the air curtain inboard of the vehicle side structure.

3. The air curtain delivery assembly of claim 1, wherein the channel includes a vehicle-forward portion substantially matching a downward angle of a vehicle A pillar.

4. The air curtain delivery assembly of claim 1, wherein the open mouth is defined along the longitudinal length of the channel.

5. A vehicle including the air curtain assembly of claim 1.

6. An air curtain delivery assembly, comprising:
   an arcuate extruded unitary channel defining a cross-section width that is greater than a cross-section depth; and
   an inflatable air curtain;
   the channel having an open mouth defining a mouth width to provide a ramp for directing deployment of the inflatable air curtain from an interior of the channel to at least partially overlie a vehicle side structure;
   wherein the mouth width is less than the cross-section width.

7. The air curtain delivery assembly of claim 6, wherein the channel includes a longitudinal length defining an arc substantially matching a vehicle fore-aft curvature of a vehicle roof panel.

8. The air curtain delivery assembly of claim 7, further wherein the channel is configured and dimensioned for attaching to a portion of the vehicle roof panel beneath a vehicle headliner and/or a trim piece overlying the vehicle side structure and the open mouth is positioned to deploy the air curtain to at least partially overlie the vehicle side structure.

9. The air curtain delivery assembly of claim 7, wherein the open mouth is defined along the longitudinal length of the channel.

10. The air curtain delivery assembly of claim 6, wherein the channel includes a vehicle-forward portion substantially matching a downward angle of a vehicle A pillar.

11. A vehicle including the air curtain delivery assembly of claim 6.

12. A delivery device for an inflatable air curtain, comprising an arcuate extruded unitary channel having a longitudinal length defining a predetermined fore-aft curvature and having a cross-section width that is greater than a cross-section depth;
    the channel further having an open mouth defining a mouth width to provide a ramp for directing deployment of the inflatable air curtain from an interior of the channel and inboard of a vehicle side structure;
    wherein the mouth width is less than the cross-section width.

13. The delivery device of claim 12, wherein the predetermined fore-aft curvature substantially matches a cooperating vehicle roof panel fore-aft curvature.

14. The delivery device of claim 12, wherein the channel includes a vehicle-forward portion substantially matching a downward angle of a vehicle A pillar.

15. The delivery device of claim 12, wherein the arcuate extruded unitary channel is dimensioned to be attached to a portion of the vehicle roof panel beneath a vehicle headliner and/or a trim piece overlying the vehicle side structure.

16. The delivery device of claim 15, wherein the open mouth directs deployment of the inflatable air curtain inboard of the vehicle side structure and over a vehicle pillar trim piece.

17. The delivery device of claim 12, wherein the open mouth is defined along the longitudinal length of the channel.

18. A vehicle including the delivery device of claim 12.

* * * * *